United States Patent Office 2,963,402
Patented Dec. 6, 1960

2,963,402

SUSTAINED RELEASE MEDICAMENT

Edward Nalin, 520 E. 83rd St., New York, N.Y., Eugene J. Yoss, Forest Hills, Milton Sacks and Ira Sacks, East Meadow, and Max Smedresman, Long Island City, N.Y.; said Yoss, M. Sacks, I. Sacks, and Smedresman assignors to Nysco Laboratories, Inc., Long Island City, N.Y., a corporation of New York No Drawing. Filed Jan. 18, 1955, Ser. No. 482,651

4 Claims. (Cl. 167—82)

The present invention relates generally to an improved form of medicament for oral administration and an improved method for preparing the same. It relates more particularly to an improved medicament of the timed disintegration type for oral administration.

There are many organic disorders which require for their treatment nitrate compounds which are normally highly explosive. For example, in the treatment of cardiac conditions, it is common practice to orally administer nitroglycerin, mannitol hexanitrate, pentaerythritol tetranitrate, or similar compounds. These substances are physiologically characterized by their vasodilator action thereby causing persistent relaxation of the smooth muscle and the smaller blood vessels, a fall in blood pressure and a reduction in hypertension. However, their physiological effects are normally experienced for a period only of approximately two hours after oral administration, and the dose must thus be regularly repeated. The active ingredients are usually admixed with an inert carrier, and formed into tablets having a relatively low percentage of the active ingredient.

Since medicinal substances of the above type require regular and continuous administration because of their limited time of effectiveness, it is highly desirable to produce the medicament in a form wherein the active ingredients are released over an extended period, so as to obviate the necessity for the continuous repeated administration thereof. Such medicament, if in the form of the so-called timed disintegration capsules, would provide great advantages and convenience. The timed disintegration capsule generally consists of a gelatin capsule carrying a plurality of small pellets containing the active ingredients, the pellets being covered with coatings which disintegrate in the body fluids. The pellet coatings are of various thickness so that their disintegration and the release of the active ingredients extends over any desired period. Such timed disintegration capsules are disclosed in Australian Patent No. 109,438 issued in 1938. However, by reason of the highly explosive nature of the physiologically active nitrated organic compounds, it has been heretofore impossible to produce a medicament containing such substance in a form in which the active ingredient is released over a relatively long period of time.

It is thus a principal object of the present invention to provide an improved medicament.

Another object of the present invention is to provide an improved medicament whose physiologically active ingredient is of a highly explosive nature.

Still another object of the present invention is to provide an improved form of medicament in which the active ingredients are released over extended periods of time.

A further object of the present invention is to provide an improved medicament whose active ingredient is of a highly explosive nature, and is released when administered over extended periods of time.

Another object of the present invention is to provide an improved explosion hazard-free medicament whose active ingredient is of a highly explosive nature and present in relatively high concentrations, and is released when administered over extended periods of time.

Still another object of the present invention is to provide an improved timed release medicament whose active ingredient is of a highly explosive nature, which medicament may be produced with a minimum explosive hazard.

A further object of the present invention is to provide an improved method for producing timed disintegration capsules having an active ingredient of a highly explosive nature.

It is a feature of the present invention to provide a medicament comprising a pellet of innocuous material carrying in an intimately admixed state a normally explosive, physiologically active substance and a desensitizing vehicle, said active ingredient-carrying pellet being covered by a coating disintegratable in the body fluids. The normally explosive physiologically active ingredient may partially or wholly impregnate the pellet or may form a coating thereon impregnating the pellet to a greater or lesser depth to form a firm bond thereto. It has been found that pellets of this type may be produced with a high concentration of normally explosive active ingredients without explosion danger or hazard and that the end product is perfectly safe in this respect. Pellets having disintegratable coatings of various thicknesses are admixed and carried in gelatin capsules so that the active ingredients are released over a prolonged period of time.

The pellets, per se, are produced in the conventional manner and are of generally spherical shape and preferably of a size between 8 and 40 mesh per inch. The pellets should be formed of an innocuous, disintegratable excipient such as milk sugar, cane sugar, dicalcium phosphate, mannitol, sorbitol, or any other suitable excipient, organic or inorganic. The normally explosive active ingredient may be mannitol hexanitrate, erythritol tetranitrate, pentaerythritol tetranitrate nitroglycerine, inositol hexanitrate, or other explosive physiologically active ingredient. The desensitizing vehicle may be a pharmaceutical glaze such as shellac, a natural wax such as beeswax or carnauba wax, a synthetic wax or cellulose acetate phthalate, or other suitable cellulose derivative, or any other innocuous desensitizing material which is compatible with the active ingredients.

In applying the desensitizing vehicle-carried active ingredient to the pellets, the active ingredient and the desensitizing vehicle are admixed in a volatile liquid in which they are miscible and preferably soluble, such as acetone, chloroform, ether or the like. A measured quantity of the pellets, which may be of uniform or varying sizes, are deposited in a suitable mixer. The solution or mixture of the active ingredient and desensitizing vehicle in the volatile liquid is then added to the mixer to effect a uniform distribution of the active ingredients and vehicle onto the pellets. Upon evaporation of the liquid, the active ingredients distributed in the vehicle forms a coating on the pellets, partially impregnating the pellets and firmly bonded thereto. The concentration of the active ingredient depends on the dosage requirements and it has been found that as high as an 11% concentration or higher of mannitol hexanitrate based on the total weight of the medicament, is completely safe in its explosive properties. The relative proportions of the vehicle and the active ingredient may vary, a ratio of about 1 part vehicle to 3 parts active ingredient having been found satisfactory and safe.

Disintegratable coatings are then applied to the active pellets. These coatings may be formed of a pharmaceutical glaze, such as shellac or natural or synthetic wax or cellulose acetate phthalate each of which are enteric in nature. The thickness of the coatings of the pellets varies in a predetermined manner so that the coatings disintegrate in the body fluids, in the stomach or intestines as desired over a predetermined prolonged period. The pellets are then packaged in gelatin capsules in the desired dosage and time range, a portion of the pellets being free of the disintegratable coatings so as to free the active ingredients almost immediately.

As a specific example of the present invention, substantially spherical pellets of approximately 1 millimeter in diameter are formed of 80% cane sugar and 20% corn starch in the conventional manner.

178 pounds of the pellets are placed in a conventional type ribbon mixer to which is added an acetonic solution of shellac and mannitol hexanitrate. This latter solution comprises approximately 6¼ pounds shellac, 22½ pounds mannitol hexanitrate, 4 quarts ethanol and 9 quarts acetone. Following the complete and uniform coating of the pellets they are then placed in a dryer to completely evaporate the solvents.

Following the evaporation of the solvents 150 cc. of a solution of the pharmaceutical glaze are added to 150 lbs. of the active pellets. The pharmaceutical glaze consists of six pounds shellac per gallon of ethanol solution. Tumbling is continued for ½ hour. The addition of 150 cc. of the pharmaceutical glaze solution followed by ½ hour tumbling is repeated 20 times to achieve a coating which will disintegrate in the body cavity in approximately 2 hours. Pellets having coatings which will disintegrate in 4 and 6 hours respectively are correspondingly produced. Equal quantities of the uncoated active pellets and those coated for 2, 4 and 6 hour disintegration are homogeneously mixed and packaged in the required dosages in gelatin capsules in the conventional manner. Upon oral administration, approximately 25% of the active ingredients are released following the solution of the gelatin capsule, 25% about two hours later, 25% about four hours later and the remaining 25% about six hours later. Inasmuch as the active ingredients are effective for a period of about two hours, the desired physiological effect is experienced uniformly for a period of about 8–9 hours.

While there has been described and illustrated preferred embodiments of the present invention, it is apparent that numerous alterations and omissions may be made without departing from the spirit thereof. For example, the pellets containing the normally explosive active ingredient may contain other active desirable ingredients of an explosive or non-explosive nature which are compatible therewith such as phenobarbital or the like. These other ingredients may be applied as separate coatings, as aforesaid, or applied concurrently with the explosive ingredient or may be supplied on separate pellets. Furthermore, the coated pellets may be further coated with a layer of sugar, either colored or uncolored.

We claim:

1. An improved medicament for oral administration comprising a pellet of innocuous material, a layer of a normally explosive, physiologically active ingredient intimately admixed with and carried by a pharmaceutical glaze superimposed upon said pellet, said active ingredient being selected from the class consisting of mannitol hexanitrate, erythritol tetranitrate, pentaerythritol tetranitrate, nitroglycerine, and inositol hexanitrate and said pharmaceutical glaze being selected from the class consisting of shellac, natural wax, synthetic wax and cellulose acetate phthalate, said layer-carrying pellet being covered with a phermaceutical glaze.

2. An improved medicament for oral administration comprising a plurality of pellets formed of an innocuous material, a layer of normally explosive physiologically active ingredient intimately admixed with and carried by a pharmaceutical glaze superimposed upon each of said pellets, said active ingredient being selected from the class consisting of mannitol hexanitrate, erythritol tetranitrate, pentaerythritol tetranitrate, nitroglycerine, and inositol hexanitrate and said pharmaceutical glaze being selected from the class consisting of shellac, natural wax, synthetic wax and cellulose acetate phthalate, each of said layer-carrying pellets being covered with an enteric coating.

3. An improved medicament in accordance with claim 2, wherein said pellets are approximately 1 millimeter in diameter.

4. An improved medicament in accordance with claim 2, wherein the ratio between said pharmaceutical glaze and said active ingredient is approximately 1:3.

References Cited in the file of this patent

UNITED STATES PATENTS

| | | |
|---|---|---|
| 2,196,768 | Hiatt | Apr. 9, 1940 |
| 2,648,698 | Preckel | Aug. 11, 1953 |
| 2,738,303 | Blythe | Mar. 13, 1956 |
| 2,921,001 | McDermott | Jan. 12, 1960 |

FOREIGN PATENTS

| | | |
|---|---|---|
| 109,438 | Australia | Dec. 22, 1939 |
| 572,347 | Germany | Mar. 15, 1933 |

OTHER REFERENCES

"Tablet Coating" (Clarkson); pub. by Drug and Cos. Ind., N.Y., 1951, pp. 29, 48, 55, 61 and 63 relied on.

Stephenson: J. Pharm. and Pharmacology, vol. 3, No. 11, November 1951, pp. 767–776.